(12) United States Patent
Fifer et al.

(10) Patent No.: US 7,777,613 B2
(45) Date of Patent: Aug. 17, 2010

(54) VEHICLE ANTITHEFT SYSTEM AND METHOD

(75) Inventors: Nicholas Duane Fifer, Hoboken, NJ (US); Itzhack Goldberg, Hadera (IL); Julianne Frances Haugh, Austin, TX (US); Boaz Mizrachi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 11/971,531

(22) Filed: Jan. 9, 2008

(65) Prior Publication Data

US 2009/0174534 A1 Jul. 9, 2009

(51) Int. Cl.
*B60R 25/10* (2006.01)

(52) U.S. Cl. .......................... 340/426.11; 340/426.12; 340/426.1; 340/426.22; 340/425.5; 340/438; 340/309.16; 307/10.2; 307/10.3; 307/10.4

(58) Field of Classification Search ............ 340/426.11, 340/426.12, 425.5, 426.1, 426.18, 426.22, 340/438, 10.4, 5.53; 307/10.2, 10.3, 10.4
See application file for complete search history.

(56) References Cited

U.S. PATENT DOCUMENTS

| 5,315,286 | A | * | 5/1994 | Nolan | 340/426.12 |
| 5,729,192 | A | * | 3/1998 | Badger | 340/426.12 |
| 6,532,360 | B1 | * | 3/2003 | Shaffer | 455/404.1 |
| 7,279,806 | B2 | * | 10/2007 | Hale et al. | 307/10.4 |

* cited by examiner

*Primary Examiner*—Davetta W Goins
(74) *Attorney, Agent, or Firm*—Dillon & Yudell LLP

(57) ABSTRACT

A vehicle antitheft system and method detects the starting of a vehicle and starts a first timer. If the first timer times out without the system having detected a first predetermined sequence, the system actuates a vehicle system warning signal and starts a second timer. If the second timer times out without detecting a second predetermined sequence, which may be the same as or different from the first predetermined sequence, the system disables the vehicle. The system may send vehicle location information to a monitoring service or the like. The vehicle remains disabled until the antitheft system is reset.

18 Claims, 3 Drawing Sheets

VEHICLE ANTITHEFT SYSTEM AND METHOD

BACKGROUND OF THE INVENTION

1. Technical Field

The present invention relates generally to the field of antitheft devices, and more particularly to a vehicle antitheft system and method that includes implicit authorized operator authentication.

2. Description of the Related Art

Vehicle theft is a major problem. There exist several systems that attempt to prevent vehicle theft or track the vehicle after it has been stolen. The theft deterrent devices and systems are usually visible or placed in locations that are well known to professional thieves. The vehicle tracking devices may be defeated by experienced thieves.

SUMMARY OF THE INVENTION

The present invention provides a vehicle antitheft system and method. Embodiments of the present invention detect the starting of a vehicle. The system starts a first timer in response to the starting of the vehicle. The system is programmed to detect a first predetermined sequence of vehicle operator actions and a second predetermined sequence of vehicle operator actions, which may be the same as the first predetermined sequence. If the first timer times out without the system having detected the first predetermined sequence, the system actuates a vehicle system warning signal and starts a second timer. Examples of vehicle system warning signals include low fuel, high temperature, low oil pressure, check engine, and the like. If the second timer times out without detecting the second predetermined sequence, the system disables the vehicle. Examples of ways in which the system may disable the vehicle include disabling the ignition and/or fuel systems of the vehicle. The system may send vehicle location information to a monitoring service or the like. The vehicle remains disabled until the antitheft system is reset.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
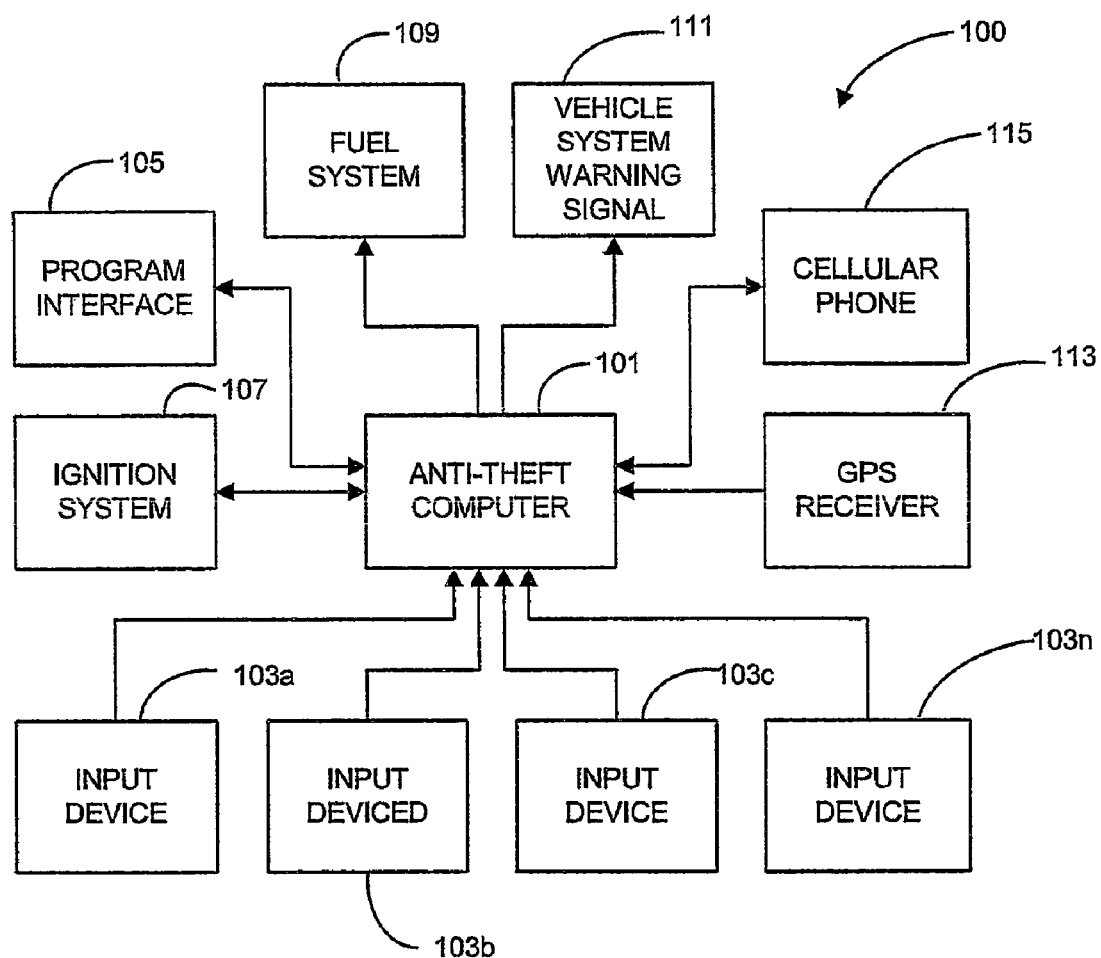
FIG. 1 is a block diagram of an embodiment of a system according to the present invention.

Referring now to the drawings, and first to FIG. 1, a system according to the present invention is designated generally by the numeral 100. System 100 includes an antitheft computer 101 programmed according to the present invention. Antitheft computer 101 may be any suitable computing device using any suitable architecture running any suitable operating system, with suitable device drivers and interfaces to the components of system 100. Antitheft computer may be a separate dedicated computer installed in a vehicle or an onboard computer adapted to perform other operations besides the theft prevention according to the present invention.

Input devices 103 may be sensors or controllers for various devices and systems in the vehicle. Input devices 103 may include such things as turn signals, door locks, side window controllers, vehicle lights, windshield washers, air-conditioning controls, audio controls, and the like. Generally, input devices 103 may include any device in the vehicle that the driver of the vehicle can operate.

As will be explained in detail hereinafter, antitheft computer 101 is programmed to look for a pre-determined sequence of actuations of various input devices 103. A predetermined sequence may consist of any sequence of driver actuations of any monitored systems in the vehicle. For example, a predetermined sequence may consist of turning on the left turn signal, followed by lowering the right rear side window, followed by raising the right rear side window, followed by turning off the left turn signal. Another predetermined sequence may consist of actuating the window washers, followed by turning the air-conditioning fan to high, followed by turning on fog lamps, followed by setting the air-conditioning system to automatic.

System 100 includes a program interface 105. Program interface 105 is used to put antitheft computer 101 into a programming mode. Program interface 105 may be a switch located in a concealed location in the vehicle. Alternatively, program interface 105 may be implemented through a standard diagnostic computer interface connection in the vehicle.

In one embodiment of the present invention, when program interface 105 is operated to put antitheft computer 101 into programming mode, any previous predetermined sequence is cleared and an operator executes a predetermined sequence. After executing the predetermined sequence, program interface 105 is operated to save the predetermined sequence and put antitheft computer 101 into operating mode.

As will be explained in detail hereinafter, when the vehicle is started, antitheft computer 101 looks for the program to predetermined sequence. Antitheft computer 101 from ignition system 107 to determine when the vehicle has been started. If antitheft computer 101 sees the predetermined sequence within a predetermined period after the vehicle is started, antitheft computer 101 allows the vehicle to continue to operate. If antitheft computer 101 does not see the predetermined sequence within the predetermined period, antitheft computer 101 disables the vehicle.

In one embodiment, antitheft computer 101 may disable the vehicle by turning off the ignition system 107. In other embodiments, antitheft computer 101 may disable the vehicle by disabling fuel system 109. According to the present invention, the vehicle remains disabled until antitheft computer 101 is reset. Antitheft computer may be reset by operating a reset control associated with program interface 105.

Prior to disabling the vehicle, antitheft computer 101 actuates one or more vehicle system warning signals 111. Actuation of a vehicle system warning signal 111 signals the vehicle driver that the vehicle is about to be disabled. An authorized driver will know that he or she must execute the programmed predetermined sequence in order to prevent the vehicle from becoming disabled. An unauthorized driver will think there is something wrong with the vehicle. Examples of vehicle system warning signals include low fuel, low oil pressure, high cooling system temperature, check engine, and the like.

System 100 may include a GPS receiver 113 and a cellular telephone 115 coupled to antitheft computer 101. When antitheft computer 101 disables the vehicle, it queries GPS receiver 113 for the vehicle's position and transmits that position to a security monitoring service, or the like. Cellular telephone 115 may also be used to reset antitheft computer 101 after the vehicles has been disabled. For example, the vehicle owner or security monitoring service employee may call cellular telephone 115 and enter a reset code, thereby resetting antitheft computer 101.

Figure 2:
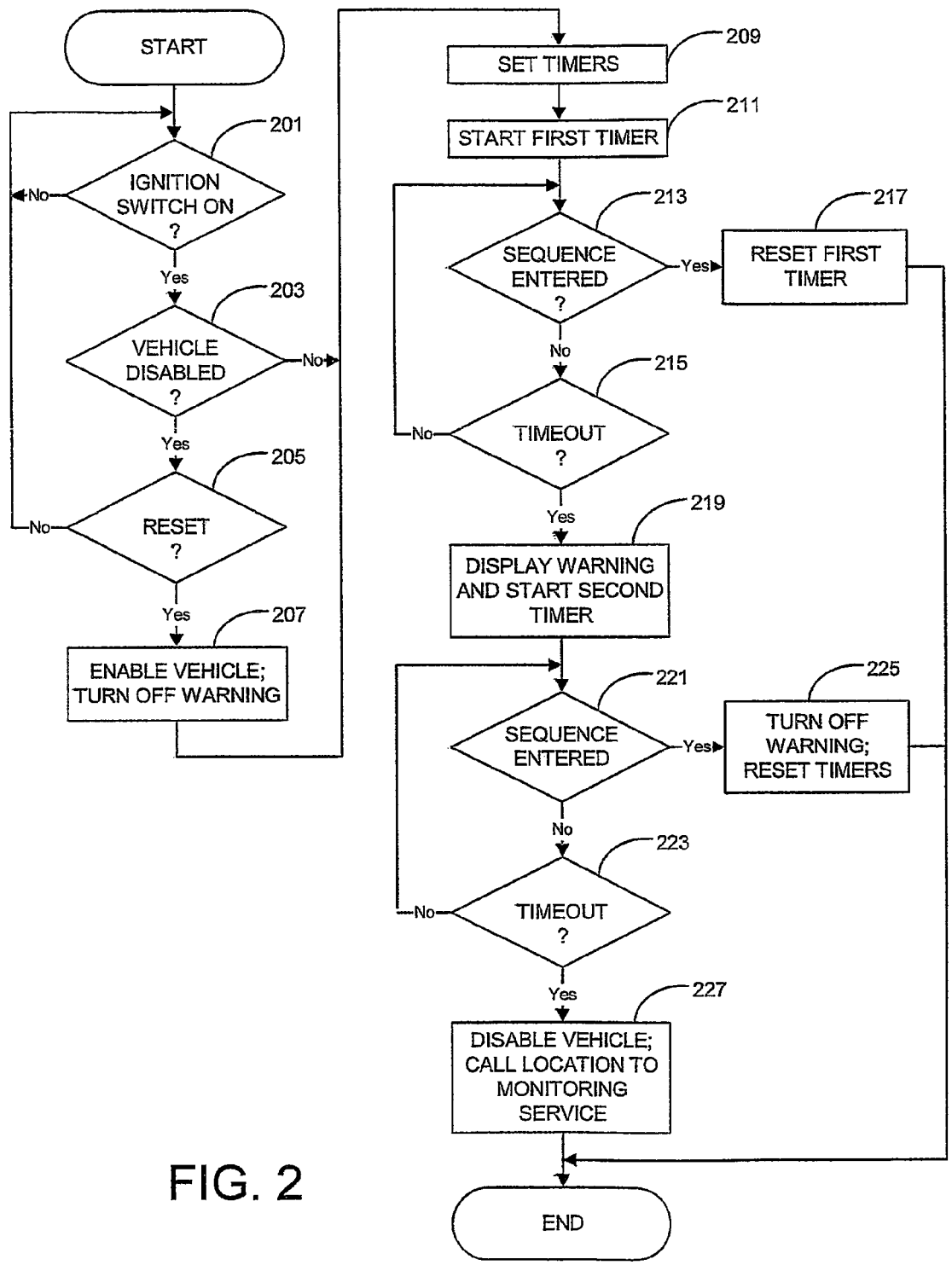
FIG. 2 is a flow chart of an embodiment of pressing according to the present invention; and, FIG. 3 is a flow chart of an embodiment of predetermined sequence detection processing according to the present invention.

FIG. 2 is a flow chart of processing according an embodiment of to the present invention. When the system determines, at decision block 201, that the ignition switch is turned on, the system determines, at decision block 203, if the vehicle is disabled. If so, the system waits for a reset signal, at decision block 205. If the vehicle is disabled, it will remain disabled until the system is reset. When the system is reset, the system enables the vehicle and turns off the vehicle system warning signal or signals, all as indicated at block 207.

If, as determined at decision block 203, the vehicle is not disabled, or after reset as determined at decision block 205, the system sets timers, at decision block 209. The preferred embodiment of the invention includes a first timer and a second timer. The system starts the first timer, at block 211. If, as determined at decision block 213, the program the predetermined sequence is entered before the first timer times out, at decision block 215, the system resets the first timer, at block 217, and processing ends. Thereafter, the vehicle will continue to run normally. If the first timer times out, at decision block 215, before the predetermined sequence is entered, the system displays the vehicle system warning signal and starts the second timer, at block 219. If, as determined at decision block 221, the predetermined sequence is entered before the second timer times out, at decision block 223, the system turns off the vehicle system warning signal and resets the timers, at block 225. Thereafter, the vehicle continues to run normally. If the second timer times out at decision block 223 before the sequences entered at decision block 221, the system disables the vehicle and calls the vehicle's location to a monitoring service, at block 227.

Figure 3:
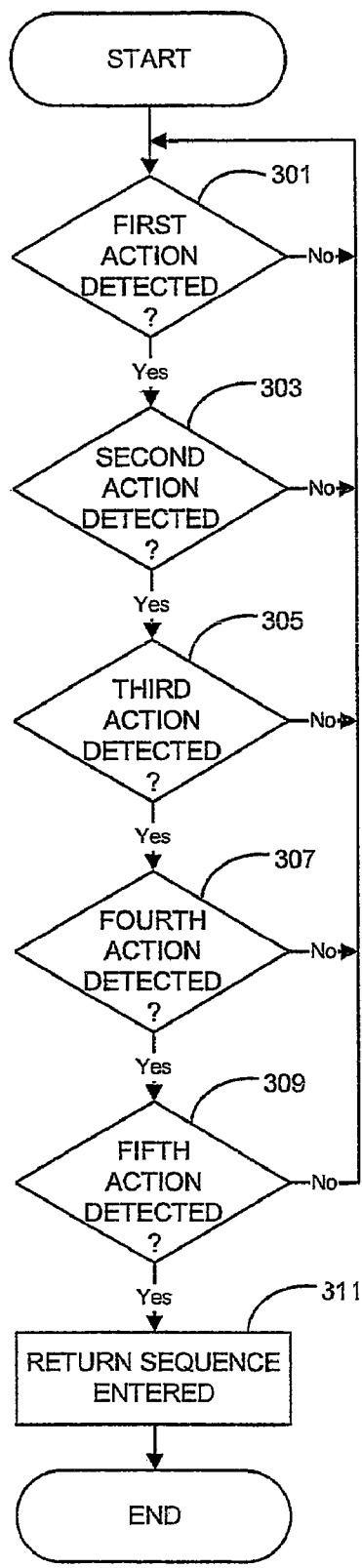

FIG. 3 is a flow chart of one embodiment of sequence detection processing according to the present invention. Antitheft computer 101 is receiving signals from each monitored driver operated system in the vehicle. In the embodiment of FIG. 3, antitheft computer 101 is looking for a particular sequence of five actions. If, as determined at decision block 301, the first action is detected, the system waits for the second action. If, as determined at decision block 303, the next action detected is not the second action of the sequence, processing returns to decision block 301 and starts over. If, as determined at decision block 303, the second action is detected, the system waits for the third action. If, as determined at decision block 305, the next action detected is not the third action, processing returns to decision block 301. If, as determined at decision block 305, the third action is detected, the system waits for the fourth action. If, as determined at decision block 307, the next action detected is not the fourth action, processing returns to decision block 301. If, as determined at decision block 307, the next action detected is the fourth action, the system waits for the fifth action. If, as determined at decision block 309, the next action is not the fifth action, processing returns to decision block 301. If, as determined at decision block 309, a next action detected is the fifth action, the system returns sequence entered, at block 311, and sequence detection processing ends. Thus, in the embodiment of FIG. 3, the operator must perform the programmed sequence in order without performing any non-sequence actions. Those skilled in the art will recognize that processing according to FIG. 3 is only one example of sequence detection processing. For example, a more rigorous processing scheme might end if after having performed the first action the operator makes a mistake. The example in FIG. 3 gives the operator the opportunity to correct a mistake by starting over, while making it unlikely that an unauthorized operator could randomly perform actions in and defeat the system.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A vehicle antitheft method, which comprises:
   an antitheft computer detecting starting of a vehicle;
   starting a first timer in response to said starting of said vehicle;
   monitoring for entry of a first pre-determined sequence of multiple vehicle operator actions in a pre-assigned sequential order;
   in response to said first timer timing out without detecting the first predetermined sequence of vehicle operator actions in the pre-assigned sequential order, actuating a vehicle system warning signal and starting a second timer; and
   in response to said second timer timing out without detecting a second predetermined sequence of vehicle operator actions, automatically disabling said vehicle;
   wherein the detecting starting of the vehicle comprises receiving inputs from an ignition system of the vehicle to determine when the vehicle has been started.

2. The method as claimed in claim 1, wherein:
   said first predetermined sequence is the same as said second predetermined sequence and comprises a first action performed by the operator involving manipulation of one or more in-vehicle electronic sensors followed by a second action that is also performed by the operator and which also involves manipulation of one or more in-vehicle electronic sensors.

3. The method as claimed in claim 1, further comprising:
   in response to detecting said first predetermined sequence before said first timer times out, resetting and disengaging said first timer such that entry of the first predetermined sequence is required only once following a start up of the vehicle.

4. The method as claimed in claim 1, further comprising:
   in response to detecting said second predetermined sequence before said second timer times out:
   de-actuating said vehicle system warning signal; and
   resetting said first and second timers.

5. The method as claimed in claim 1, further comprising:
   after disabling said vehicle, maintaining said vehicle in a disabled condition until receiving a reset signal; and
   on receipt of the reset signal, subsequently enabling a reset of the antitheft computer to remove the disabled condition of the vehicle, wherein the reset signal is received by calling a cellular phone and entering the reset signal over the cellular phone.

6. The method as claimed in claim 5, further comprising:
   receiving said reset signal, and in response to receiving said reset signal:

enabling said vehicle;
resetting said first and second timers; and,
de-actuating said vehicle system warning signal.

7. The method as claimed in claim 1, further comprising:
in response to said second timer timing out without detecting said second predetermined sequence of vehicle operator actions:
querying a GPS receiver for the vehicle's current position; and
transmitting vehicle location information to a security monitoring service.

8. The method as claimed in claim 1, wherein said vehicle system warning comprises at least one signal of a group of signals comprising:
a low fuel warning signal;
a high temperature warning signal;
a low oil pressure warning signal;
a check engine warning; and,
a charging system failure warning signal.

9. The method as claimed in claim 1, wherein disabling said vehicle comprises at least one of:
disabling an ignition system of said vehicle; and,
disabling a fuel system of said vehicle.

10. A vehicle antitheft system, which comprises:
an antitheft computer;
a GPS receiver and a cellular telephone coupled to the antitheft computer;
means for detecting starting of a vehicle;
means for starting a first timer in response to said starting said vehicle;
means for monitoring for entry of a first pre-determined sequence of multiple vehicle operator actions in a pre-assigned sequential order;
means, responsive to said first timer timing out without detecting the first predetermined sequence of vehicle operator actions in the pre-assigned sequential order, for actuating a vehicle system warning signal and starting a second timer; and
means, responsive to said second timer timing out without detecting a second predetermined sequence of vehicle operator actions, for automatically disabling said vehicle;
wherein the means for detecting starting of the vehicle comprises means for receiving an input from an ignition system of the vehicle to determine when the vehicle has been started.

11. The system as claimed in claim 10, wherein:
said first predetermined sequence is the same as said second predetermined sequence and comprises a first action performed by the operator involving manipulation of one or more in-vehicle electronic sensors followed by a second action that is also performed by the operator and which also involves manipulation of one or more in-vehicle electronic sensors.

12. The system as claimed in claim 10, further comprising:
means, responsive to detecting said first predetermined sequence before said first timer times out, for resetting and disengaging said first timer such that entry of the first predetermined sequence is required only once following a start up of the vehicle.

13. The system as claimed in claim 10, further comprising:
means, responsive to detecting said second predetermined sequence before said second timer times out, for:
de-actuating said vehicle system warning signal; and,
resetting said first and second timers.

14. The system as claimed in claim 10, further comprising:
means for maintaining said vehicle in a disabled condition until receiving a reset signal; and
on receipt of the reset signal, means for subsequently enabling a reset of the antitheft computer to remove the disabled condition of the vehicle, wherein the reset signal may be received by calling a cellular phone and entering the reset signal over the cellular phone.

15. The system as claimed in claim 14, further comprising:
means, responsive to receiving said reset signal for enabling said vehicle, resetting said first and second timers, and de-actuating said vehicle system warning signal.

16. The system as claimed in claim 10, further comprising:
responsive to said second timer timing out without detecting said second predetermined sequence of vehicle operator actions:
means for querying a GPS receiver for the vehicle's current position; and
means for transmitting vehicle location information to a security monitoring service.

17. The system as claimed in claim 10, wherein said vehicle system warning comprises at least one signal of a group of signals comprising:
a low fuel warning signal;
a high temperature warning signal;
a low oil pressure warning signal;
a check engine warning; and,
a charging system failure warning signal.

18. The system as claimed in claim 1, wherein means for disabling said vehicle comprises at least one of:
disabling an ignition system of said vehicle; and
disabling a fuel system of said vehicle.

* * * * *